United States Patent
Ferri

(10) Patent No.: US 9,291,819 B2
(45) Date of Patent: Mar. 22, 2016

(54) MULTI-FOCUS HEADS-UP DISPLAY USING SINGLE PICTURE GENERATOR UNIT

(71) Applicant: Texas Instruments Incorporated, Dallas, TX (US)

(72) Inventor: John Marshall Ferri, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 64 days.

(21) Appl. No.: 14/133,311

(22) Filed: Dec. 18, 2013

(65) Prior Publication Data
US 2015/0061976 A1 Mar. 5, 2015

Related U.S. Application Data

(60) Provisional application No. 61/873,909, filed on Sep. 5, 2013.

(51) Int. Cl.
*G02B 27/01* (2006.01)
*G09G 3/00* (2006.01)

(52) U.S. Cl.
CPC .... *G02B 27/0101* (2013.01); *G02B 2027/0127* (2013.01); *G09G 3/003* (2013.01)

(58) Field of Classification Search
CPC ...... G02B 27/00; G02B 27/01; G02B 27/108; G02B 23/125; G06F 3/012; G09G 3/003
See application file for complete search history.

(56) References Cited

U.S. PATENT DOCUMENTS

| | | | |
|---|---|---|---|
| 4,973,942 A | 11/1990 | Iino | |
| 5,061,996 A | 10/1991 | Schiffman | |
| 5,121,099 A | 6/1992 | Hegg et al. | |
| 5,140,465 A | 8/1992 | Yasui et al. | |
| 5,731,903 A | 3/1998 | Cook | |
| 5,805,119 A | 9/1998 | Erskine et al. | |
| 6,757,085 B1 | 6/2004 | Halldorsson | |
| 6,789,901 B1 | 9/2004 | Kormos | |
| 7,619,825 B1 | 11/2009 | Peng et al. | |
| 7,669,543 B2 | 3/2010 | Soltendieck et al. | |
| 2005/0154505 A1* | 7/2005 | Nakamura et al. | 701/1 |
| 2009/0213037 A1* | 8/2009 | Schon | 345/7 |
| 2014/0267978 A1* | 9/2014 | Guthrie | 349/62 |

FOREIGN PATENT DOCUMENTS

EP 0009332 4/1980

* cited by examiner

*Primary Examiner* — Saiful A Siddiqui
(74) *Attorney, Agent, or Firm* — Tuenlap D. Chan; Frank D. Cimino

(57) ABSTRACT

Apparatus and methods are described for creating multiple different heads-up display (HUD) images at different apparent distances from a viewer using a single picture generator. First and second images are generated using respective first and second subsets of modulating elements of an array of image pixel modulating elements of a spatial light modulator. Light from the first and second images is directed along respective first and second optical paths onto a transparent display surface to form respective first and second virtual images at different apparent distances within a field of view of a viewer looking through the display surface. In a described example, the modulating elements are micromirrors of a digital micromirror device (DMD) and optical elements of the respective optical paths are relatively movable to set relative path lengths.

20 Claims, 5 Drawing Sheets

MULTI-FOCUS HEADS-UP DISPLAY USING SINGLE PICTURE GENERATOR UNIT

This application claims the benefit of Provisional Application No. 61/873,909 filed Sep. 5, 2013, the entirety of which is incorporated herein by reference.

BACKGROUND

This relates to heads-up displays such as used for automotive (including trucks, construction machinery, etc.) and other industrial and non-industrial applications.

Heads-up displays (HUDs) are used to present information in the form of virtual images into the field of view (FOV) of a user otherwise engaged in directly observing the outside world or some other primary subject matter. For example, automobile heads-up displays may be used to project instrument panel data or other driving or road condition information onto the windshield of a driver whose primary attention is directed at observing the road ahead. Examples of existing automotive heads-up display systems are given in U.S. Pat. Nos. 4,973,942; 5,061,996; 5,121,099; 5,140,465; 5,731,903; 5,805,119; 6,757,085; 6,789,901; 7,619,825; 7,669,543; and in EP 0 009 332 B1; the entireties of all of which are incorporated herein by reference. Other examples of heads-up display applications include projecting an aiming spot into the field of view of a hunter primarily engaged in looking at a target through a rifle scope, or projecting flight path information onto the canopy of a jet fighter to assist a pilot to land on a deck of an aircraft carrier. A usual objective of such systems is to present information in a manner that can be quickly assimilated without taking attention away from the primary visual objective. The heads-up display apparatus should preferably also be configured to provide minimum obstruction to the view of the outside world and other instruments.

Current HUD designs present a virtual image to the user that is either set at a fixed distance or has a continuously changing focus position due to the virtual image being tilted. There are, however, situations when it is desirable to display two or more virtual images each with a different virtual image distance relative to the viewer. For example, it may be desirable in an automobile heads-up display system to present a first virtual image of symbols, arrows or other directional/warning information far out on the road and a second virtual image of speedometer, temperature, pressure or other instrument panel/sensor data in alphanumeric or analog form beneath the first image at a distance much closer to the viewer. One approach to such multi-focus systems is to use two separate displays set at different locations behind the optics to create spatially separated images at two different virtual image distances. An arrangement of this type is illustrated in FIG. 1.

FIG. 1 illustrates an automobile heads-up display system 100 which projects multiple virtual images 102, 104 at different distances from a driver 106 seated behind a steering wheel and observing the oncoming roadway through a windshield. The far virtual image 102 includes directional/warning information or other graphics that overlay on the road area and is observed ahead of the driver, superimposed over an object of interest down the road. The image 102 may, for example, be a highlighted outline of a road sign and overlapped onto the road sign in order to alert the driver to its presence. The near virtual image 104 includes instrument panel/sensor data and is observed ahead of the driver below the first image and superimposed over the roadway at a position near to the automobile front hood. The image 104 may, for example, be an alphanumerical display of current odometer speed, radiator coolant temperature, oil pressure, and similar data. Both images are presented for viewing in the field of view and provide information to the driver without the need for the driver to look away from the oncoming roadway. In a typical application, the far virtual image may, for example, appear at a distance of somewhere between 8 and 30 meters and the near virtual image may, for example, appear at a distance of somewhere between 2 and 4 meters.

In the illustrated configuration, each image 102, 104 is generated using a different picture generator unit (PGU), such as a respective different LCD panel 108, 110. LCD panel 108 serves as the image display source for far virtual image 102, and LCD panel 110 serves as the image display source for near virtual image 104. The light from each display unit is then directed via a common optical relay path onto the surface of the windshield and then reflected into the driver's field of view. The common optical path may, for example, include first and second mirrors 112, 114 and a light transmitting HUD unit cover 116. The HUD unit LCD panels 108, 110 and optical elements 112, 114 may, for example, be housed in a protected space behind the instrument console with the transparent cover fitted to an opening in the dashboard over the steering wheel. Mirrors 112, 114 may serve reflective and/or folding purposes which together with an image separation distance between the two LCD panels 108, 110 set the different virtual image positions for the two virtual images 102, 104.

Drawbacks to the illustrated arrangement include spatial limitations imposed by dimensional requirements needed for the separate LCD panels, and focus range limitations due to the commonly shared optical components.

SUMMARY

A heads-up display system is provided which forms two spatially separated virtual images at different distances from a user using a single image generating device.

DETAILED DESCRIPTION OF EXAMPLE EMBODIMENTS

Figure 1:
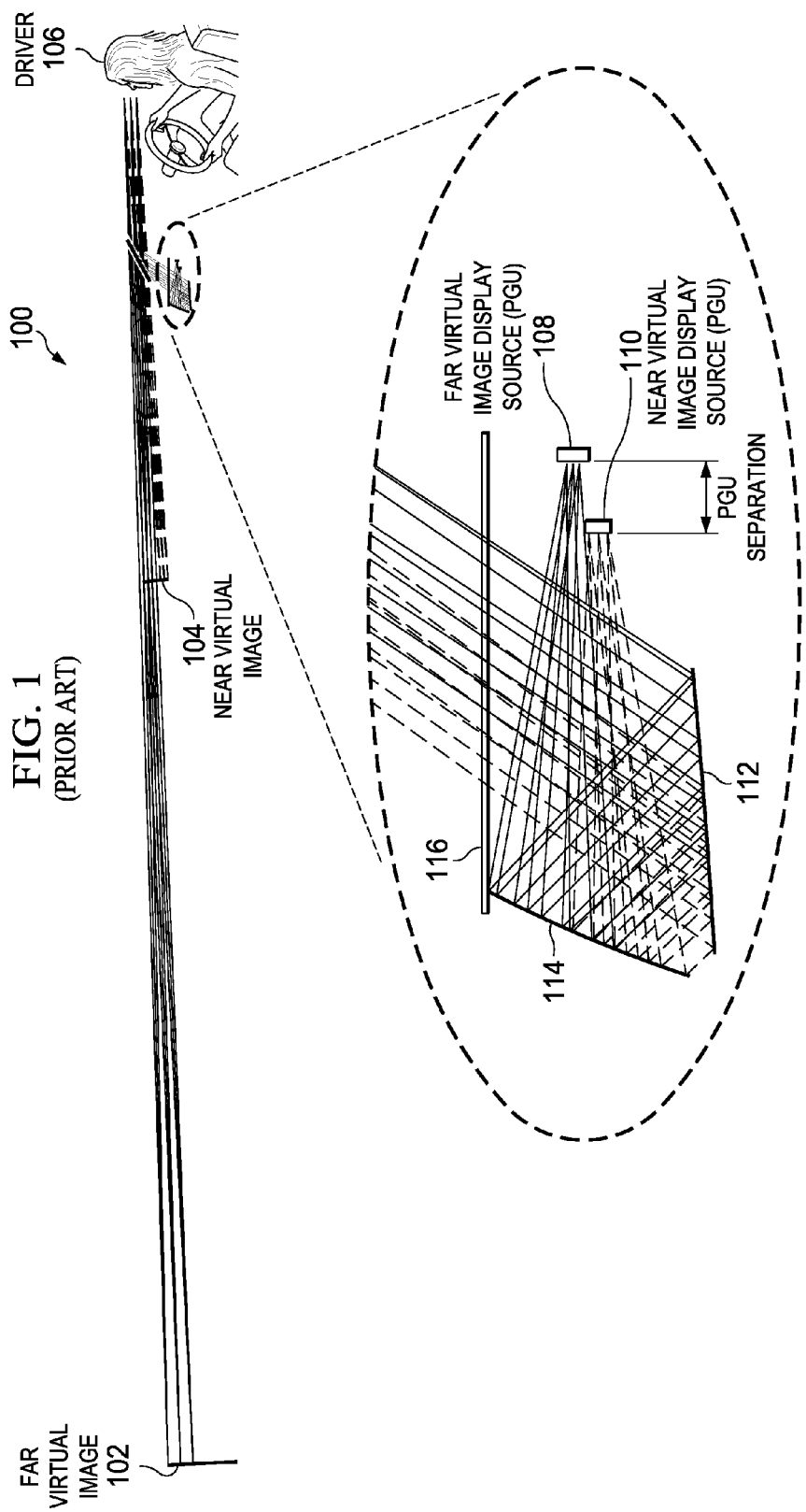
FIG. 1 illustrates a multi-focus heads-up display system utilizing multiple picture generator units.
Figure 2:
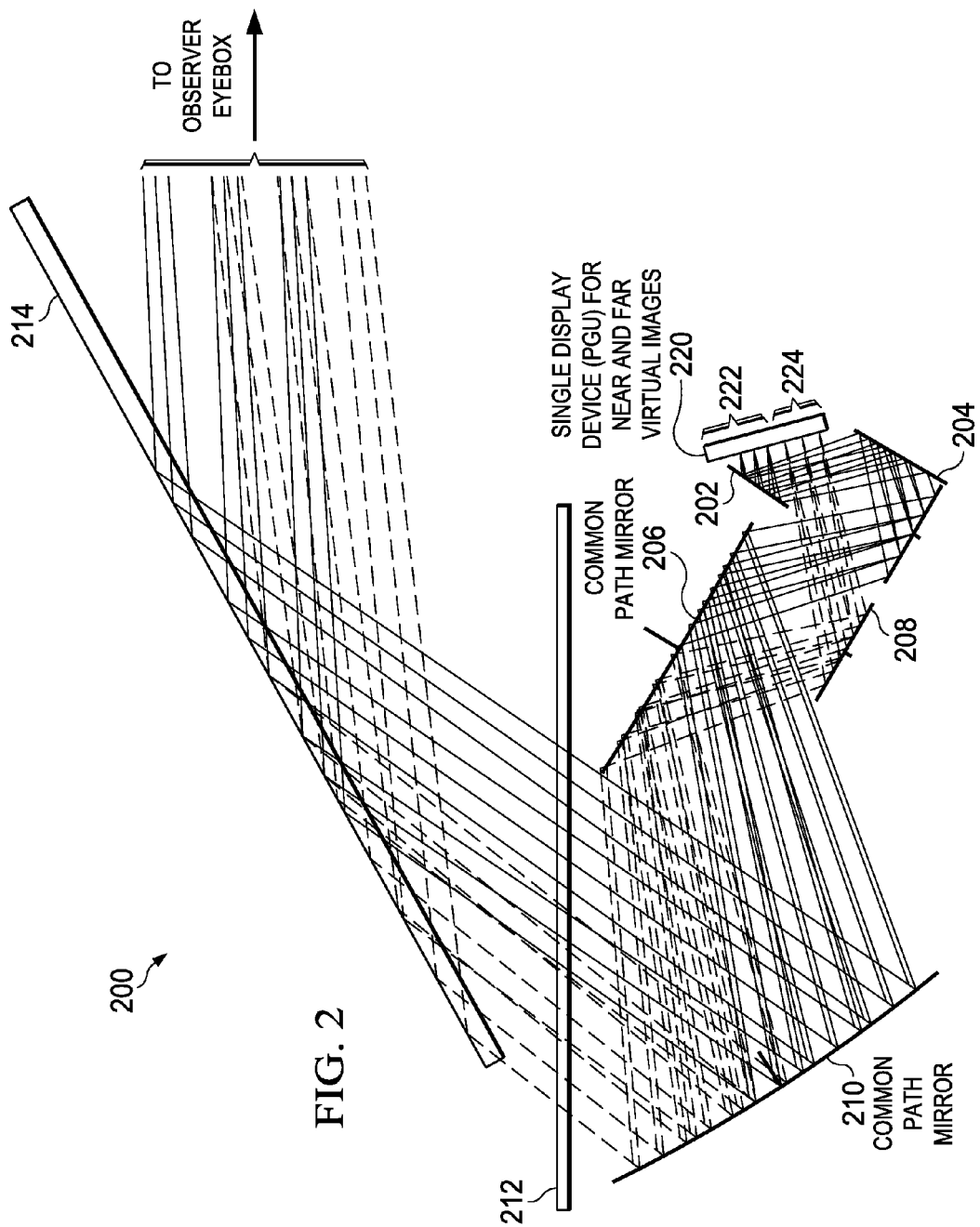
FIG. 2 illustrates a multi-focus heads-up display system using a shared picture generator unit.

FIG. 2 illustrates an example embodiment of a heads-up display system 200 that uses a series of flat fold mirrors 202, 204, 208 and common path powered mirrors 206, 210 to create two or more distinct optical path distances for different sections of a single heads-up display. The difference in optical paths creates different virtual image distances 102, 104 (FIG. 1) between two or more parts of the displayed image. In contrast to the previously described system 100 of FIG. 1, the illustrated example utilizes a single display picture generating unit 220 instead of two different displays 108, 110 to create two different virtual images at different virtual image near and far distances within the field of view of an observer 106.

In the illustrated configuration, system 200 utilizes a spatial light modulator (SLM) 220 such as a Texas Instruments DLP® digital micromirror device (DMD) to generate the content of both the projected far and the projected near virtual images. The light modulator 220 includes an array of image pixel modulating elements that are individually addressed in synchronism with light incident from a source of illumination to spatially transmit or reflect the incident light to set the brightness and color of corresponding pixels of the projected images according to pixel lumina and chroma information supplied for the respective images. In the shown example, a first subset of the modulating elements 222 (shown as the top portion of the array in FIG. 2) is used to generate the image that will be projected for visualizing the far virtual image, while a second subset 224 (shown as the bottom portion of the array in FIG. 2) is used to generate the image that will be projected for visualizing the near virtual image. The modulated light from the first subset 222 is directed onto first folding mirror 202, then onto second folding mirror 204, then onto a first portion of mirror 208, then onto a first portion of mirror 206, then onto a first portion of mirror 210, then through a transparent display cover 212, and then onto the windshield 214, from which it enters the field of view of the driver to be perceived as the far virtual image at a focal plane distance 102. The modulated light from the second subset 224 takes a shorter path between the modulator 220 and the windshield 214. That light is directed from the second subset 224 onto a second portion of the mirror 208, then onto a second portion of the mirror 206, then onto a second portion of the mirror 210, then through the display cover 212, and onto the windshield 214, from which it enters the field of view of the driver to be perceived as the near virtual image at a focal plane distance 104.

The use of a single display device 220 instead of two separate displays 108, 110 to generate two virtual images at different distances 102, 104 significantly reduces the cost and electrical power requirements of a heads-up display. Because different subsets of modulator elements of an array of the same spatial light modulator are used, the dimensional restraints present with multiple display devices are absent, thereby enabling a more compact arrangement. Near and far virtual images share a common set of powered optics which reduces cost and mechanical volume.

Another advantage of the described arrangement is that the fold mirrors can be configured so that mirrors used to establish the path length for one of the images can be moved relative to mirrors used to establish the different path length for another of the images, which enables the virtual image distance to be adjusted separately for one or more of the images while keeping the display at a fixed location. This is illustrated by the system 300 shown in FIGS. 3A and 3B.

Figure 3A:
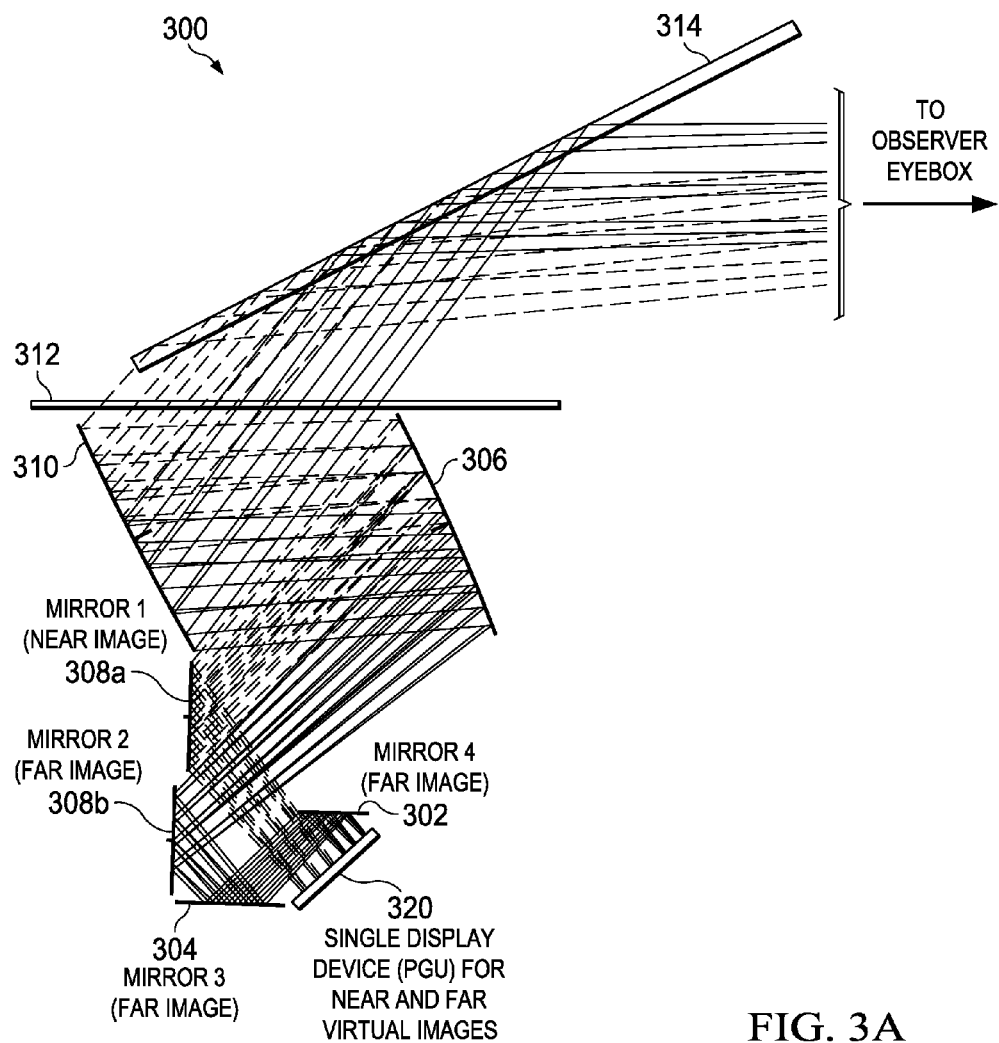
FIGS. 3A-3B illustrate a system as in FIG. 2 modified to provide a virtual image distance difference adjustment capability.
Figure 3B:
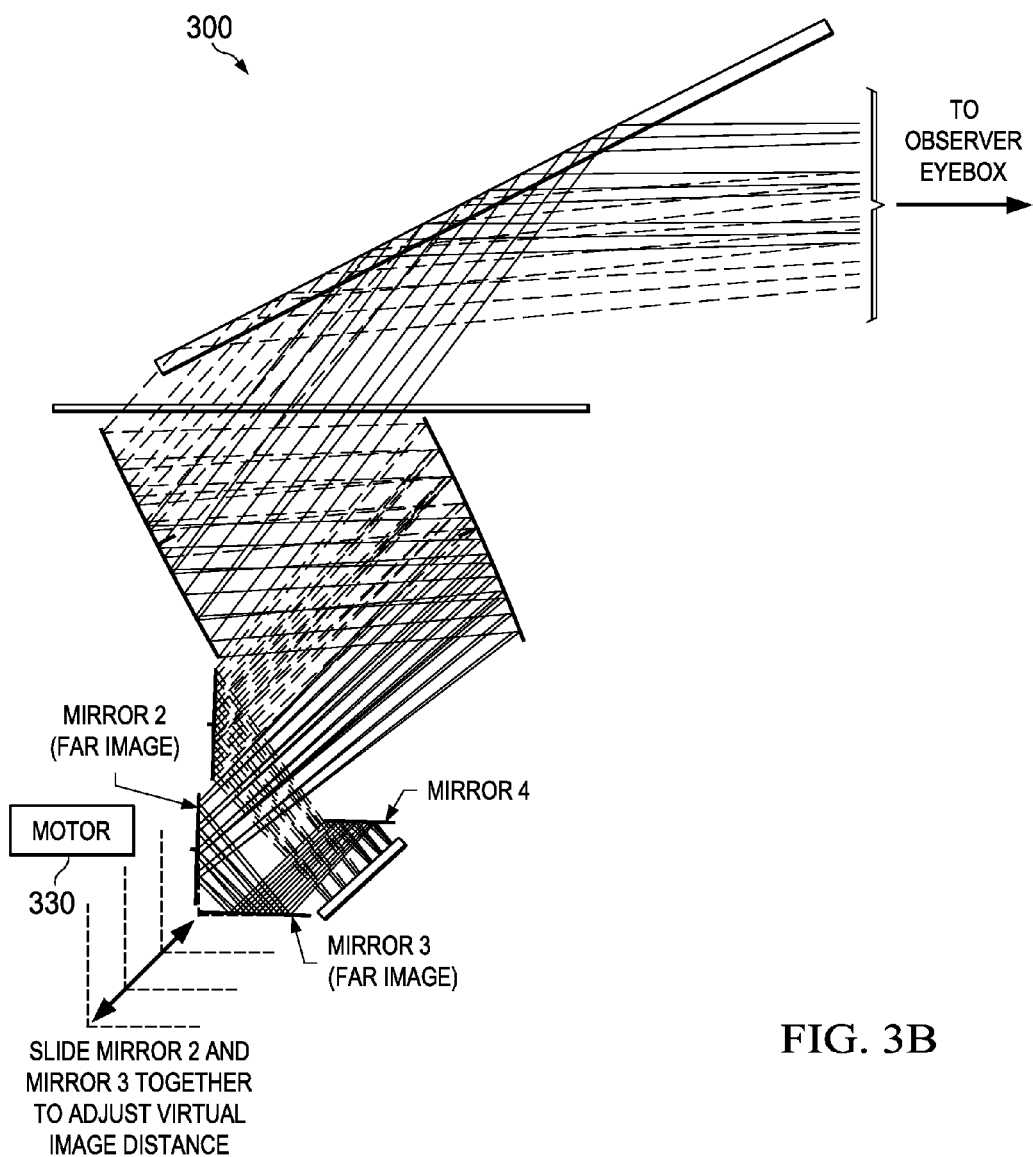

Although their placements and orientations may be changed in order to accommodate changes in particular needs and preferences, the mirrors 302, 304, 306, 310 shown in FIG. 3A serve roles similar to those performed by the correspondingly numbered mirrors previously described with reference to FIG. 2. As before, different subsets of modulating elements of the same modulator 320 are used to generate both far and near virtual images with light modulated by a first subset (top portion of array of 320) being directed along a longer optical path to be perceived at a far focal plane distance 102 and light modulated by a second subset (bottom portion of array of 320) being directed along a shorter optical path to be perceived at a near focal plane distance 104. In contrast to system 200, however, the functions of the first and second portions of mirror 208 in FIG. 2 are now handled by separate mirrors 308a, 308b which are relatively movable for varying the path length of the longer optical path independent of the path length of the shorter optical path. This is illustrated in FIG. 3B which shows multiple positions of the combination of mirrors 304, 308b in a direction parallel to the direction of incidence of light directed by mirror 302 onto mirror 304 and parallel to the direction of reflection of light reflected off mirror 308b onto mirror 306. In the shown configuration, mirrors 304, 308b are oriented at right angles to each other, with movement back and forth in a direction bisecting the right angle. The relative back and forth motion of mirrors 304, 308b may, for example, suitably be controlled through mechanical motion driven by a motor 330. In the illustrated configuration, mirrors 302, 308a are flat mirrors used for beam steering.

Figure 4:
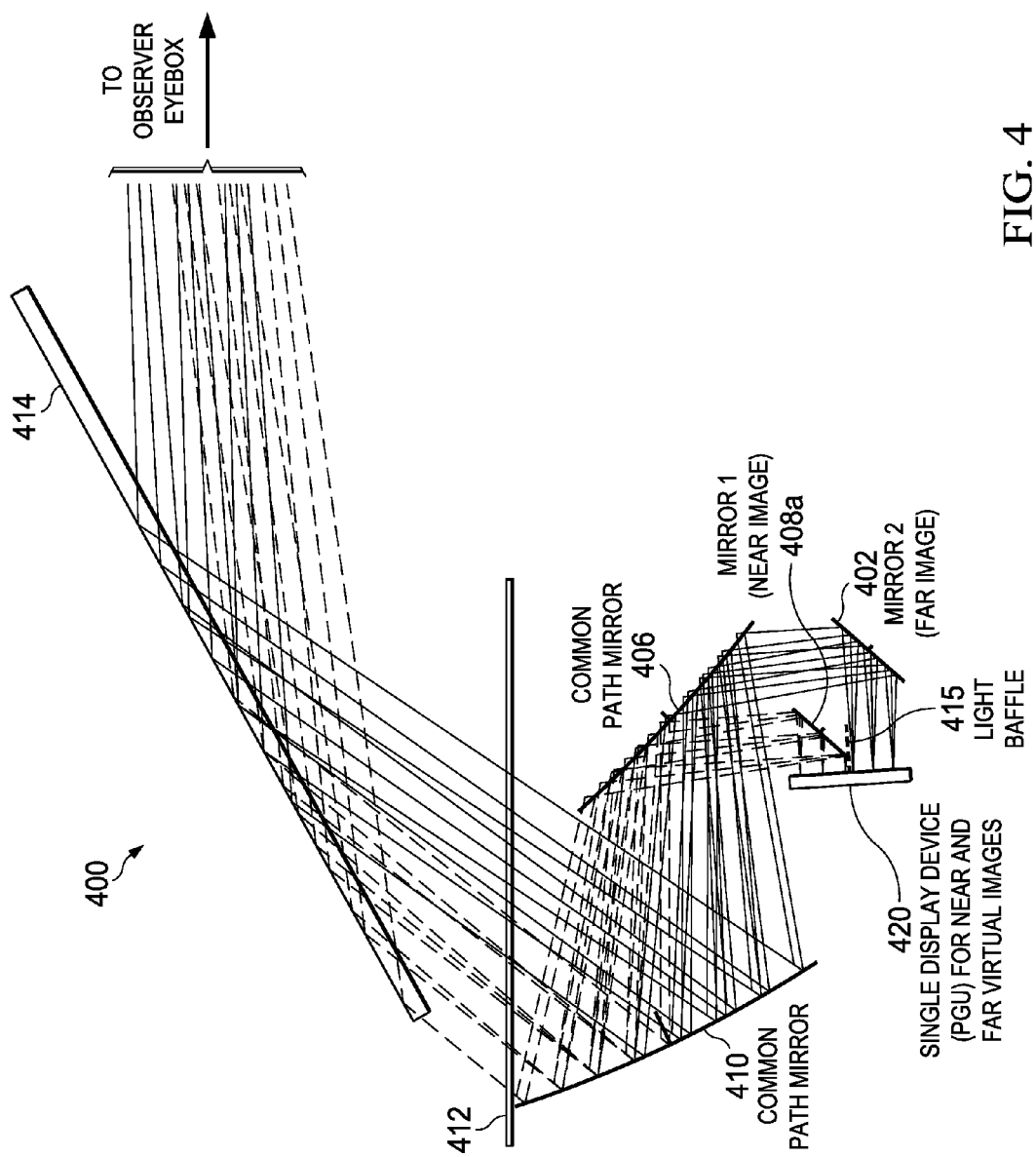
FIG. 4 illustrates a system as in FIG. 2 modified to simplify the common optical path.

FIG. 4 illustrates another heads-up display system 400 arrangement which has a simplified projection optics design. Here, the respective far and near image light paths are separated by a light baffle 415 which separates the light modulated by the first and second subarrays of modulator 420. After modulation by the first subset of modulators (bottom in FIG. 4), the far image light is directed onto mirror 402, then onto a first portion of mirror 406, then onto a first portion of mirror 410, then through display cover 412, and onto windshield 412 to then be reflected into the field of view of the driver. After modulation by the second subset of modulators (top in FIG. 4), the near image light is directed onto mirror 408a, then onto a second portion of mirror 406, then onto a second portion of mirror 410, then through display cover 412, and onto windshield 412 to then be reflected into the field of view of the driver. Baffle 415 keeps the modulated light from the respective subsets separated. Mirror 408a is placed, for example, at a 45° angle close to the modulator surface or other suitable placement and orientation for compactly steering the near image light along its respective folded path separate from the longer path of the far image light. In the shown configuration, mirror 406 has a convex reflective surface and mirror 410 has a concave reflective surface, with first and second portions of those mirrors shaped to provide the desired power and steering (incl. distortion and ray aberration correction, if applicable) for the respective far and near image light. It will be appreciated that other optical elements (lenses, mirrors) and other arrangements can be configured to match individual needs and preferences.

The described implementations serve to create multiple different heads-up display (HUD) images at different apparent distances from the viewer using a single display source. The described application illustrates the application of the disclosed principles in an automotive context wherein a far image may be superposed on the direct view of the approaching roadway at some distance from the automobile and include, for example, augmented reality and driver safety graphics. A near virtual image may be simultaneously displayed below the far virtual image at roadway position closer to the driver and include, for example, driver information data, text and gauges. The described images are merely examples of implementations, and it will be appreciated that the same principles may be applied in other contexts and for the presentation of multiple images other than two images. Moreover, it will be appreciated that the same principles may be applied to many other heads-up display applications besides automotive applications.

The described approach offers advantages over current systems which use two or more display devices to create separate virtual images at different locations. This is a brute force method that uses more power and increases cost. Implementations of the described system that use a single picture generation unit (PGU) to create dual images using a single DMD, LCoS, or similar spatial light modulator to achieve the dual focus effect offer benefits of lower cost, lower power consumption, and avoid mechanical space constraints inherent in multiple PGU implementations.

The described mechanical variation of the length of one of the paths provides a capability for varying the focus position of one virtual image relative to another, without moving the image generator (i.e., without moving the spatial light modulator). The use of a series of fold mirrors that move together (304, 308b in FIG. 3A) in a motor driven mechanical adjustment is just one way of achieving this, and other methods of adjustment are also contemplated. Further, the focus variation is not limited to just one of the image paths but can be applied to the other path, or paths, as well. This can either be done by path variation mechanisms applied individually to each optical path and/or by mechanisms that vary optical paths together. For example, the far image path may be varied by movement of mirrors 304, 308b as already described, and both far and near image paths may be varied together such as by motor movement of one or both of common mirrors 306, 310 or by adjusting the position of the PGU 320. This will create continually variable focus ability while maintaining a common focus location on the picture generation unit (viz., on the array plane of the spatial light modulator).

Those skilled in the art will appreciate that modifications may be made to the described embodiments, and also that many other embodiments are possible, within the scope of the invention.

What is claimed is:

1. A method for creating multiple different heads-up display images at different apparent distances from a viewer, comprising:
    generating a first image using a first subset of modulating elements of an array of image pixel modulating elements of a spatial light modulator;
    generating a second image using a second subset of modulating elements of the array of image pixel modulating elements of the spatial light modulator, the second subset of modulating elements separated from the first subset of modulating elements, such that the second image is separately generated from the first image;
    directing light from the first image along a first optical path onto a transparent display surface to form a first virtual image at a first apparent distance within a field of view of a viewer looking through the display surface;
    directing light from the second image along a second optical path, shorter than the first optical path, onto the transparent display surface to form a second virtual image at a second apparent distance within the field of view of the viewer looking through the display surface.

2. The method of claim 1, wherein the array of image pixel modulating elements comprises an array of micromirrors of a digital micromirror device.

3. The method of claim 2, wherein the first image is a far virtual image, and the second image is a near virtual image.

4. The method of claim 3, wherein directing light along the first optical path includes directing light onto a first portion of a first mirror and onto a first portion of a second mirror; and directing light along the second optical path includes directing light onto a second portion of the first mirror and onto a second portion of the second mirror.

5. The method of claim 4, wherein directing light along the first optical path further includes directing light onto a third mirror positioned outside of the second optical path; and directing light along the second optical path further includes directing light onto a fourth mirror positioned outside of the first optical path.

6. The method of claim 5, wherein the third and fourth mirrors are relatively moveable to set the relative path lengths of the respective first and second optical paths.

7. The method of claim 5, wherein directing light along the first optical path includes directing light through a transparent display cover and then onto a windshield, from which the light directed along the first optical path enters the field of view of the viewer.

8. The method of claim 7, wherein directing light along the second optical path includes directing light through the transparent display cover and then onto the windshield, from which the light directed along the second optical path enters the field of view of the viewer.

9. The method of claim 8, wherein the first apparent distance is about 8 to 30 meters ahead of the viewer, and the second apparent distance is about 2 to 4 meters ahead of the viewer.

10. The method of claim 9, wherein the display surface is a windshield of an automobile, the display cover is the cover of an automobile heads-up display system, and the first and second images are directed to form the far and near virtual images at different apparent distances from a driver seated behind a steering wheel of the automobile and observing the oncoming roadway through the windshield.

11. The method of claim 10, wherein the far virtual image includes at least one of direction information, warning information or graphics appearing on a road area observed ahead of the driver.

12. The method of claim 11, wherein the far virtual image appears superimposed over an object of interest on the road.

13. The method of claim 12, wherein the far virtual image appears as a highlighted outline of a road sign overlapped onto a road sign.

14. The method of claim 11, wherein the near virtual image includes instrument panel or sensor data.

15. The method of claim 14, wherein the near virtual image appears ahead of the driver, below the far virtual image.

16. The method of claim 15, wherein the near virtual image appears over the roadway at a position near to a front hood of the automobile.

17. The method of claim 16, wherein the near virtual image includes an alphanumerical display of at least one of current odometer speed, radiator coolant temperature or oil pressure.

18. The method of claim 3, wherein the first and second optical paths are established by mirrors configured so that mirrors used to establish a path length for one of the first and second optical paths are selectively movable relative to mirrors used to establish a different path length for the other of the first and second optical paths.

19. A system for creating multiple different heads-up display images at different apparent distances from a viewer, comprising:
    a spatial light modulator having an array of image pixel modulating elements configured for generating a first image using a first subset of the modulating elements, and for generating a second image using a second subset of the modulating elements, the first subset of the modulating elements separated from the second subset of the modulating elements such that the second image is separately generated from the first image;
    first optical elements defining a first optical path configured for directing light from the first image onto a transparent display surface to form a first virtual image at a first apparent distance within a field of view of a viewer looking through the display surface;
    second optical elements defining a second optical path, shorter than the first optical path, configured for directing light from the second image onto the transparent display surface to form a second virtual image at a second apparent distance within the field of view of the viewer looking through the display surface.

20. The system of claim 19, wherein the array of image pixel modulating elements comprises an array of micromirrors of a digital micromirror device; the first optical elements include a first mirror; and the second optical elements include a second mirror; and further including a mechanical mechanism for moving the first mirror relative to the second mirror to set the relative lengths of the first and second optical paths.

* * * * *